(12) United States Patent
Ohsugi

(10) Patent No.: US 12,709,289 B2
(45) Date of Patent: Aug. 18, 2026

(54) AUTONOMOUS DRIVING SYSTEM

(71) Applicant: TOYOTA JIDOSHA KABUSHIKI KAISHA, Toyota (JP)

(72) Inventor: Masamichi Ohsugi, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 3 days.

(21) Appl. No.: 18/815,264

(22) Filed: Aug. 26, 2024

(65) Prior Publication Data

US 2025/0074447 A1 Mar. 6, 2025

(30) Foreign Application Priority Data

Sep. 5, 2023 (JP) ................................ 2023-143466

(51) Int. Cl.
*B60W 50/14* (2020.01)
*B60W 60/00* (2020.01)

(52) U.S. Cl.
CPC .......... *B60W 50/14* (2013.01); *B60W 60/001* (2020.02); *B60W 2050/146* (2013.01); *B60W 2540/215* (2020.02); *B60W 2556/45* (2020.02)

(58) Field of Classification Search
CPC ............... B60W 50/14; B60W 60/001; B60W 2540/215; B60W 2556/45; B60W 2050/146
USPC .......................................................... 340/438
See application file for complete search history.

(56) References Cited

U.S. PATENT DOCUMENTS 10,759,446 B2 * 9/2020 Motomura ............ B60W 50/14
10,956,755 B2 * 3/2021 Musk ..................... G06V 20/58
11,163,304 B2 * 11/2021 Iwamoto ............. B60W 30/025
11,308,357 B2 * 4/2022 Iwasaki .................... G08G 1/16
11,713,060 B2 * 8/2023 Gross ..................... G08G 1/164 701/2
11,820,387 B2 * 11/2023 Chaves ................... H04W 4/40
11,840,234 B1 * 12/2023 Ward .................... B60W 40/04
11,919,536 B2 * 3/2024 Ji ....................... B60W 60/0015
12,005,928 B2 * 6/2024 McCawley .......... G06N 3/0475
12,008,899 B2 * 6/2024 Yang ....................... H04W 4/40
12,024,207 B2 * 7/2024 Niewiadomski .. B60W 60/0053
2019/0291748 A1 * 9/2019 Takahashi ............. B60W 30/18
2019/0324457 A1 * 10/2019 Iwamoto ............. B60W 30/025
(Continued)

FOREIGN PATENT DOCUMENTS

JP 2018-045303 A 3/2018
JP 2020-194499 A 12/2020
(Continued)

*Primary Examiner* — Zhen Y Wu
(74) *Attorney, Agent, or Firm* — Dinsmore & Shohl LLP

(57) ABSTRACT

An autonomous driving system includes an external sensor, an internal sensor, a machine learning model configured to receive a detection result of the external sensor and the internal sensor as input values and output an instruction value of autonomous driving, an operation unit configured to perform the autonomous driving based on the instruction value, a user interface, and a control unit, wherein the control unit includes, determining at least one risk candidate scene, and extracting the input value and the instruction value in the at least one risk candidate scene, and causes the user interface to notify the occupant of monitoring information including information indicating that the input value and the instruction value have been extracted.

5 Claims, 4 Drawing Sheets

(56) References Cited

U.S. PATENT DOCUMENTS

| | | | | |
|---|---|---|---|---|
| 2020/0047772 | A1* | 2/2020 | Yasue | B60W 30/12 |
| 2020/0164888 | A1* | 5/2020 | Hiramatsu | G05D 1/0088 |
| 2020/0302233 | A1* | 9/2020 | Iwasaki | G06V 10/774 |
| 2022/0080888 | A1 | 3/2022 | Hayashi et al. | |
| 2022/0097711 | A1* | 3/2022 | Liu | G08G 1/096741 |
| 2023/0001948 | A1* | 1/2023 | Hayashi | B60W 50/14 |
| 2023/0271621 | A1* | 8/2023 | Wakabayashi | B60W 40/02<br>701/300 |
| 2023/0278579 | A1* | 9/2023 | Kim | B60K 35/23 |

FOREIGN PATENT DOCUMENTS

| | | | |
|---|---|---|---|
| JP | 2021-152888 | A | 9/2021 |
| WO | 2019/116423 | A1 | 6/2019 |

* cited by examiner

VEHICLE
2
1
12
AUTONOMOUS DRIVING ECU
10
EXTERNAL SENSOR
11
INTERNAL SENSOR
120
MACHINE LEARNING MODEL
121
OPERATION UNIT
3
ACTUATOR
13
USER INTERFACE
15
CONTROL UNIT
17
TRANSMISSION UNIT
14
OPERATION STATE DETECTION SENSOR
16
STORAGE UNIT
D
EXTRACTED DATA
4
SERVER

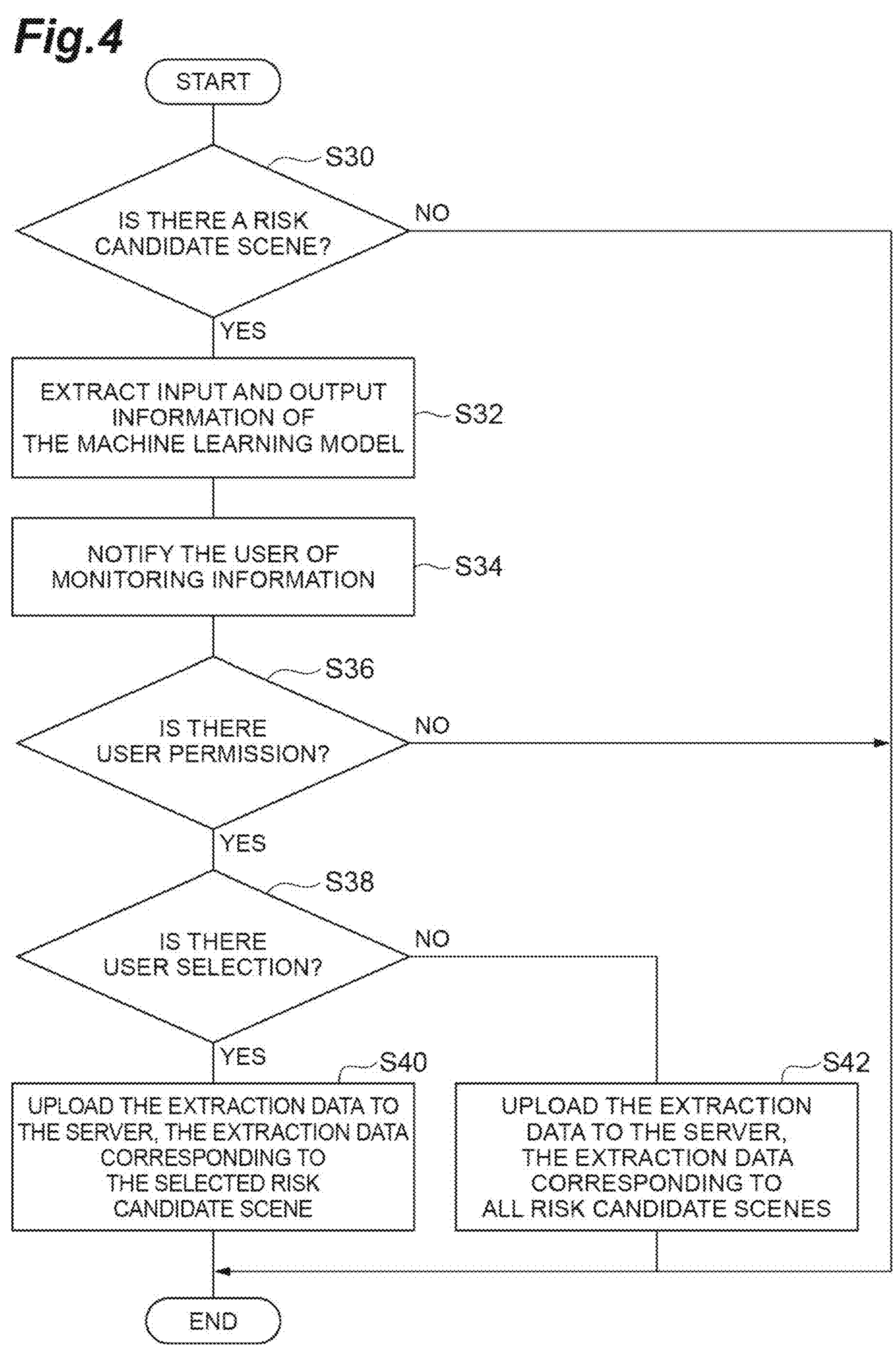
Fig.4
START
S30
IS THERE A RISK CANDIDATE SCENE?
NO
YES
EXTRACT INPUT AND OUTPUT INFORMATION OF THE MACHINE LEARNING MODEL
S32
NOTIFY THE USER OF MONITORING INFORMATION
S34
S36
IS THERE USER PERMISSION?
NO
YES
S38
IS THERE USER SELECTION?
NO
YES
S40
UPLOAD THE EXTRACTION DATA TO THE SERVER, THE EXTRACTION DATA CORRESPONDING TO THE SELECTED RISK CANDIDATE SCENE
S42
UPLOAD THE EXTRACTION DATA TO THE SERVER, THE EXTRACTION DATA CORRESPONDING TO ALL RISK CANDIDATE SCENES
END

AUTONOMOUS DRIVING SYSTEM

CROSS-REFERENCE TO RELATED APPLICATION

This application is based on Japanese Patent Application No. 2023-143466 filed with Japan Patent Office on Sep. 5, 2023, the entire contents of which are hereby incorporated by reference.

TECHNICAL FIELD

The present disclosure relates to an autonomous driving system.

BACKGROUND

International Publication No. WO2019/116423 discloses a device that collects teacher data for machine learning for autonomous driving. This apparatus includes a sensor that acquires external environment information and a control unit that assigns a label to information of interest included in the acquired external environment information. In a case where the vehicle can pass without performing the avoidance operation at a time point when the external environment information is collected, the control unit assigns a label indicating that the vehicle can pass to the information of interest. When the avoidance operation is performed, the control unit assigns a label indicating non-passable to the information of interest. As a result, at least a part of labeling (annotation work) for the external environment information is automated, and reduction in effort, reduction in time, and reduction in cost of teacher data generation work are realized.

SUMMARY

The trained model generated by machine learning (hereinafter, referred to as the “machine learning model”) may not always achieve appropriate vehicle control in all situations. Therefore, in order to appropriately operate the autonomous driving control by the machine learning model, a configuration for monitoring the autonomous driving control is indispensable. The present disclosure provides a technique for allowing a user to appropriately monitor autonomous driving by a machine learning model.

An autonomous driving system according to an embodiment of the present disclosure includes an external sensor, an internal sensor, a machine learning model, an operation unit, a user interface, and a control unit. The external sensor detects an external environment of a vehicle. The internal sensor detects a traveling state of the vehicle. The machine learning model receives a detection result of the external sensor and a detection result of the internal sensor as input values, and outputs an instruction value of autonomous driving of the vehicle. The operation unit performs the autonomous driving of the vehicle based on the instruction value output by the machine learning model. The user interface exchanges information with an occupant of the vehicle. The control unit is connected to the user interface. The control unit determines at least one risk candidate scene based on at least one selected from a group of a detection result of the external sensor, a detection result of the internal sensor, and an operating state of an occupant of the vehicle. The control unit extracts an input value and an instruction value of a machine learning model in at least one risk candidate scene. The control unit causes the user interface to notify the occupant of the vehicle of monitoring information including information indicating that the input value and the instruction value have been extracted.

In the autonomous driving system, at least one risk candidate scene is determined based on at least one selected from a group of the detection result of the external sensor, the detection result of the internal sensor, and the operating state of the occupant of the vehicle. Then, an input value and an instruction value of the machine learning model in the at least one risk candidate scene are extracted. Then, monitoring information including information indicating that the input value and the instruction value have been extracted is notified to the occupant of the vehicle. As described above, since the autonomous driving system can autonomously determine the risk candidate scene and notify the user (occupant of the vehicle) of the monitoring information, it is possible to allow the user to appropriately monitor the autonomous driving by the machine learning model.

In an embodiment, the autonomous driving system may further include a transmission unit configured to transmit the monitoring information to a device outside the vehicle. The monitoring information may include request information for selecting whether or not to transmit to the device outside the vehicle. The control unit may cause the transmission unit to transmit extraction data, which is the extracted input value and the extracted instruction value of the machine learning model, to the device outside the vehicle in response to reception of a response permitting transmission to the device outside the vehicle via the user interface. Since the information is sent (uploaded) based on the user permission, the autonomous driving system can realize the monitoring and notification under the control of the user.

In an embodiment, the control unit may present the at least one risk candidate scene to the occupant of the vehicle through the user interface, and cause the transmission unit to transmit the extraction data corresponding to the risk candidate scene selected by the occupant of the vehicle through the user interface. Since the information is transmitted (uploaded) based on the user’s selection, the autonomous driving system can realize the user’s initiative to monitor and notify.

In an embodiment, the control unit may receive a ranking of at least one risk candidate scene designated by the occupant of the vehicle through the user interface, and determine the extraction data to be transmitted by the transmission unit based on the ranking. Since the information is transmitted (uploaded) based on the user’s designation, the autonomous driving system can realize the monitoring and notification mainly by the user. In addition, the autonomous driving system may prioritize the extraction data to be uploaded.

In an embodiment, the control unit may calculate a similarity between risk candidate scenes based on the input value and the instruction value in the risk candidate scenes, classify the risk candidate scenes into categories based on the similarity calculated, and present the risk candidate scenes to the occupant of the vehicle for each of the categories classified, through the user interface. Since the risk candidate scene is presented for each category, the autonomous driving system can present information to the user so that the user can easily select the risk candidate scene.

In an embodiment, the control unit may extract the data such that the extraction data corresponding to the risk candidate scene instructed from the occupant of the vehicle through the user interface includes more information than extraction data corresponding to the risk candidate scene non-instructed. Since the extraction data corresponding to the risk candidate scene designated by the user includes more information, the autonomous driving system can realize the monitoring and notification by the user.

According to the present disclosure, it is possible to cause a user to appropriately monitor autonomous driving by a machine learning model.

BRIEF DESCRIPTION OF DRAWINGS

FIG. 4 is a flowchart illustrating an example of an operation of a n autonomous driving system according to the embodiment.

DETAILED DESCRIPTION

Hereinafter, embodiments of the present disclosure will be described with reference to the drawings. In the description of the drawings, the same element is denoted by the same symbol, and redundant description is omitted.

[Configuration of Vehicle]

Figure 1:
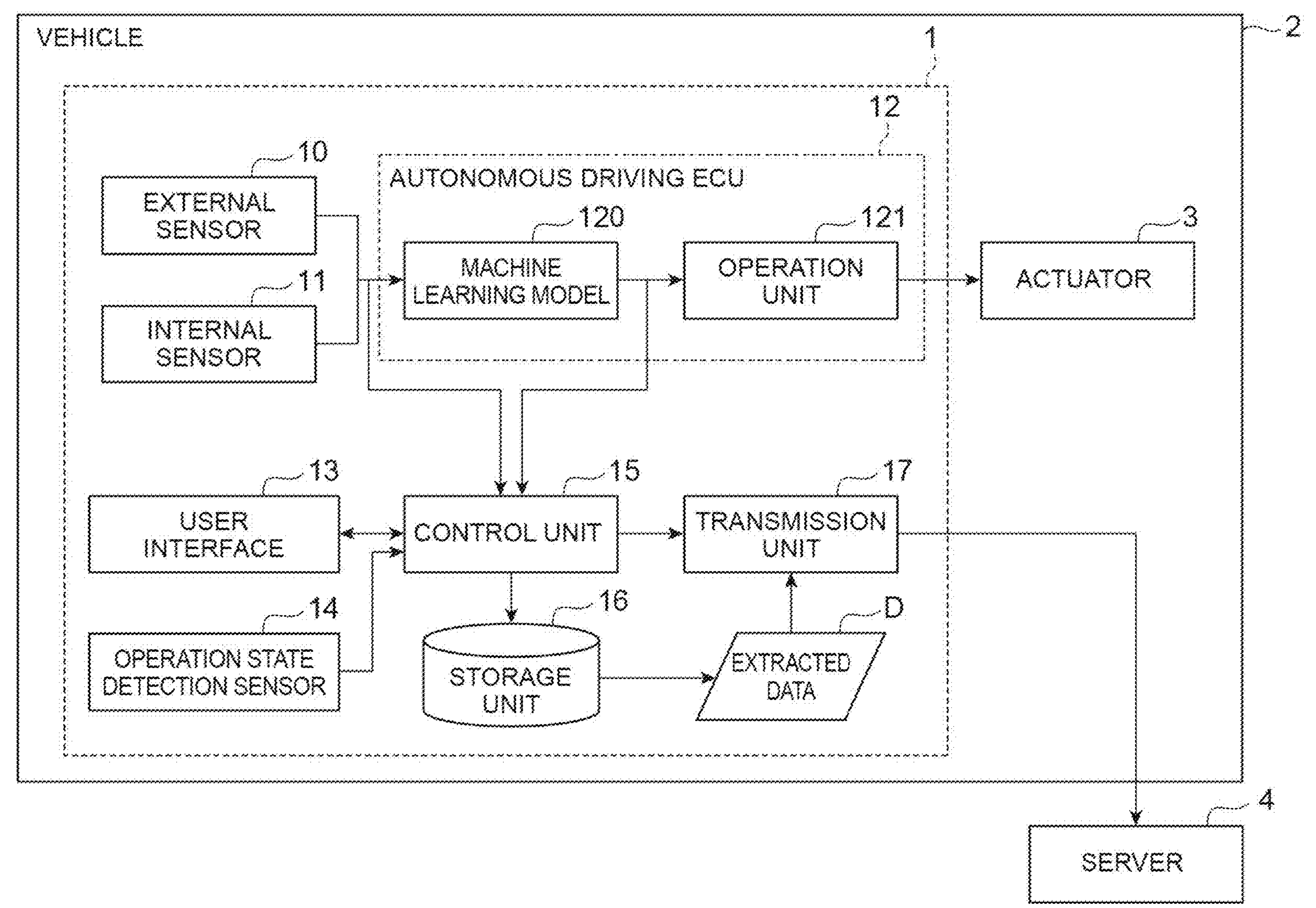
FIG. 1 is a block diagram illustrating an example of a configuration of a vehicle including an autonomous driving system according to an embodiment.

FIG. 1 is a block diagram illustrating an example of a configuration of a vehicle including an autonomous driving system according to an embodiment. As shown in FIG. 1, an autonomous driving system 1 is mounted on a vehicle 2 as an example, and causes the vehicle 2 to function as an autonomous driving vehicle. The autonomous driving system 1 operates an actuator 3 of the vehicle 2 to realize autonomous driving. The actuator 3 includes, for example, an engine actuator, a brake actuator, and a steering actuator.

The autonomous driving system 1 includes, by way of example, an external sensor 10, an internal sensor 11, an autonomous driving ECU 12, a user interface 13, an operation state detection sensor 14, a control unit 15, a storage unit 16, and a transmission unit 17.

The external sensor 10 is an in-vehicle sensor that detects the external environment of the vehicle 2. The external sensor 10 includes at least one of a camera and a radar sensor. The external sensor 10 outputs detection information about the image and surrounding objects to the autonomous driving ECU 12.

The internal sensor 11 is an in-vehicle sensor that detects the traveling state of the vehicle 2. The internal sensor 11 includes, for example, a vehicle speed sensor, an acceleration sensor, and a yaw rate sensor. The internal sensor 11 outputs detection information regarding the traveling state of the vehicle 2 to the autonomous driving ECU 12.

The autonomous driving ECU 12 includes a machine learning model 120 and an operation unit 121. The ECU (Electronic Control Unit) includes a CPU (Central Processing Unit), a ROM (Read Only Memory), a RAM (Random Access Memory), a CAN (Controller Area Network), and the like. This is an electronic control unit having a communication circuit and the like. The autonomous driving ECU 12 realizes autonomous driving by an AI (Artificial Intelligence) system by using the machine learning model 120.

The machine learning model 120 receives the detection result of the external sensor 10 and the detection result of the internal sensor 11 as input values and outputs an instruction value of the autonomous driving in the vehicle 2. An example of the machine learning model 120 is a recursive deep learning model. For example, the machine learning model 120 performs learning on the basis of teacher data including an input value and an instruction value of autonomous driving, and is distributed to the vehicles 2. The instruction value of the autonomous driving is a control value of the actuators 3. The operation unit 121 operates the actuator 3 on the basis of the instruction value output by the machine learning model 120 and autonomously drives the vehicle 2.

The user interface 13 is a device that interacts with an occupant of the vehicle 2. Hereinafter, the occupant is also referred to as a user. The user interface 13 receives the monitoring information from the control unit 15 and notifies the occupant of the information. The monitoring information will be described later. The user interface 13 receives the user operation from the occupant. The user interface 13 is, for example, a touch panel. The user interface 13 may include a speaker and a microphone. In other words, the notification may include a voice notification, and the user operation may include a voice instruction.

The operation state detection sensor 14 is a device that detects an operating state of an occupant. The operation state detection sensor 14 detects driver interventions in autonomous driving by the occupant, or rapid acceleration operations, sudden braking operations or abrupt steering. The operation state detection sensor 14 may be, for example, a brake pedal sensor, an accelerator pedal sensor, or a steering sensor. The operation state detection sensor 14 may include a driver monitor camera or a biological sensor to detect a driving condition of the occupant.

The control unit 15 is a device that controls an operation for monitoring autonomous driving. The control unit 15 is constituted by, for example, an ECU. The control unit 15 acquires the input value and the instruction value of the machine learning model 120 and stores them in the storage unit 16. The storage unit 16 is a storage device such as a hard disk drive (HDD). The storage unit 16 stores the input value and the instruction value of the machine learning model 120 in the predetermined period.

The control unit 15 determines at least one risk candidate scene based on at least one selected from a group of the detection result of the external sensor 10, the detection result of the internal sensor 11, and the operating state of the occupant of the vehicle 2. The risk candidate scene may be, for example, a scene in which a driver intervenes (accelerator, brake, or the like), rapid acceleration/deceleration, a steering angle is equal to or greater than a threshold value, a distance between the vehicle 2 and a surrounding vehicle is equal to or less than a threshold value, a distance between the vehicle 2 and a peripheral division line is equal to or less than a threshold value, a klaxon is sounded, a driver is surprised, or the like.

The control unit 15 may set a scene in which a lane departure risk occurs and a scene in which a collision risk between the vehicle 2 and another object occurs as risk candidate scenes. For example, the control unit 15 uses a lane position with respect to the vehicle 2, positions of surrounding traffic participants, and a recognition result of a surrounding structure to determine a first scene in which a lane boundary line is equal to or less than a threshold value from the center of the vehicle 2 or has a minimum value in a situation in which there are no surrounding traffic participants or surrounding structures, as a scene in which a lane departure risk occurs. In the control unit 15, the first scene in which the distance between the predicted positions of the vehicle 2 and other traffic participants at each time is equal to or less than a threshold value or is the minimum is set as a scene in which a collision risk with other objects has occurred. By adopting the smallest value, the control unit 15 can determine the risk candidate scene without depending on a difference which is difficult to set in advance and which is felt to have a risk for each user.

The control unit 15 may be connected to the user interface 13, may acquire the voice of the occupant through the user interface 13, and may determine the risk candidate scene based on the voice recognition result. For example, the control unit 15 may recognize the utterance of the occupant such as "The response to the cutting-in vehicle is slow and dangerous" or "The reason is not found, but the host vehicle travels toward the right of the lane", and set the scene corresponding to the utterance as the risk candidate scene. For example, the control unit 15 determines that "vehicles traveling in other lanes enter the own lane" at the closest time in the data traced back from the time at which the utterance is made based on the utterance "The response to the cutting-in vehicle is slow and dangerous". The scene may be specified, and the data from the time at which the vehicle starts the behavior of starting to approach the own lane to the time at which the indication is made may be autonomously specified. Alternatively, the control unit 15 may determine that "the host vehicle is approaching the right side of the lane" at the closest time in the data traced back from the time at which the utterance is made based on the utterance "The reason is not found, but the host vehicle travels toward the right of the lane". The scene may be specified, and the data from the time at which the vehicle 2 traveled in the center of the lane before starting the behavior to the time at which the indication was made may be autonomously specified.

The control unit 15 extracts the input value and the instruction value of the machine learning model 120 in the at least one risk candidate scene. The control unit 15 refers to the storage unit 16, extracts the input value and the instruction value of the machine learning model 120 that match the time range in which the risk candidate scene occurs, and regards the extracted values as extraction data D. The time range in which the risk candidate scene occurs may be a predetermined time before and after the occurrence timing of the risk candidate scene.

The control unit 15 notifies the occupant of the vehicle 2 of the monitoring information via the user interface 13. The monitoring information is information for monitoring autonomous driving using the machine learning model 120, and includes information indicating that the input value and the instruction value of the machine learning model 120 in the risk candidate scene have been extracted.

The control unit 15 has the transmission unit 17 send the extraction data D to a server 4. The transmission unit 17 is a communication device capable of wireless communication. Thus, only the extracted data is uploaded. The uploaded information may be used for early risk discovery and response.

The control unit 15 may have the transmission unit 17 send the extraction data D to the server 4 only with the vehicle 2 occupant's permission. For example, the monitoring information includes request information for selecting whether or not to perform transmission to the server 4. The control unit 15 presents the request information to the occupant of the vehicle 2 together with the fact that the extraction data D has been extracted. The control unit 15 causes the transmission unit 17 to transmit the extraction data D to the server 4 in response to receiving a response permitting transmission to the server 4 via the user interface. In this way, the extraction data D may be uploaded only with user permission. In this case, since only the permitted information can be uploaded, it is possible to avoid pressure of the data volume while reducing the communication source.

The control unit 15 may present at least one risk candidate scene to the occupant of the vehicle 2 through the user interface 13, and may allow the occupant of the vehicle 2 to transmit the extraction data D corresponding to the selected risk candidate scene to the transmission unit 17 through the user interface 13. The control unit 15 presents a risk candidate scene generated in a predetermined period to an occupant of the vehicle 2. The control unit 15 may present the categorized risk candidate scenes. For example, the control unit 15 may calculate the similarity between risk candidate scenes based on the input value and the instruction value in the risk candidate scenes and classify the risk candidate scenes into categories based on the calculated similarity. Accordingly, the control unit 15 can present the risk candidate scene to the occupant of the vehicle 2 for each classified category.

The occupant of the vehicle 2 selects a risk candidate scene as an upload target from the presented risk candidate scenes. The user interface 13 receives a selection operation of the occupant. The control unit 15 generates the extraction data D corresponding to the selected risk candidate scene. The control unit 15 then causes the transmission unit 17 to send the extraction data D. In this case, since necessary information can be selected and uploaded, it is possible to avoid pressure on the data volume while reducing the communication source.

The control unit 15 may receive the ranking of the at least one risk candidate scene designated by the occupant of the vehicle 2 through the user interface 13, and may determine the extraction data D transmitted by the transmission unit 17 based on the ranking. For example, the above-described priorities of the risk candidate scenes are previously designated as rankings by an occupant in the vehicle 2. When a plurality of risk candidate scenes is determined, the control unit 15 determines a risk candidate scene based on the ranking and generates the extraction data D. Accordingly, in a case where the communication amount is limited, the control unit 15 can generate the extraction data D corresponding to the risk candidate scene of the high ranking (high priority).

The control unit 15 may change the size of the extraction data D according to the risk candidate scene. For example, in the control unit 15, a time range for extracting the extraction data D may be set for each risk candidate scene. Alternatively, in a situation where the autonomously extracted extraction data D is transmitted in a state where transmission is comprehensively permitted, when an instruction indicating a risk candidate scene is received from an occupant of the vehicle 2 via the user interface 13 with respect to a certain scene, the control unit 15 may extract data so as to include more information than the extraction data D corresponding to the risk candidate scene for which the instruction is not received.

Figure 2:
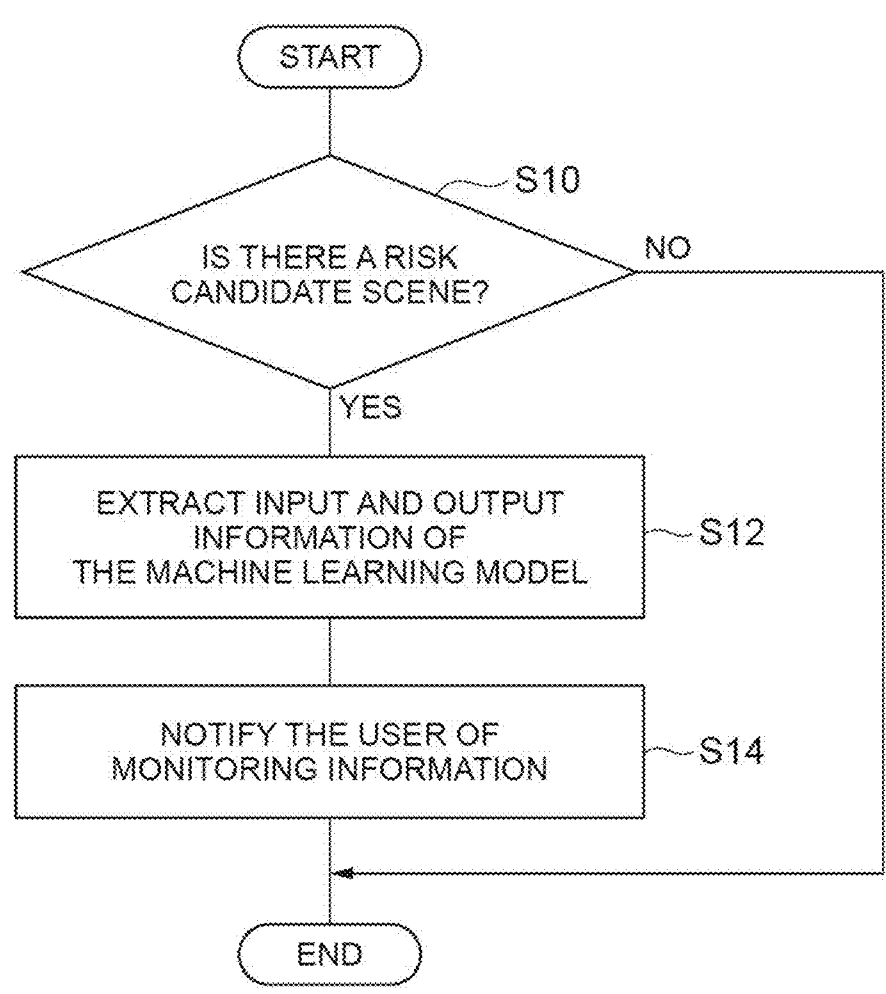
FIG. 2 is a flowchart illustrating an example of an operation of a n autonomous driving system according to the embodiment.

Next, the operation of the autonomous driving system 1 will be described. FIG. 2 is a flowchart illustrating an example of an operation of an autonomous driving system according to an embodiment. The flowchart shown in FIG. 2 is started when the autonomous driving system 1 receives a start instruction operation during autonomous driving by the autonomous driving system 1.

As shown in FIG. 2, first, the control unit 15 of the autonomous driving system 1 determines whether there is a risk candidate scene, as step S10. The control unit 15 determines that there is a risk candidate scene when detecting driver interventions (accelerator, brake, etc.), rapid acceleration/deceleration, steering angle equal to or greater than a threshold value, distance between the vehicle 2 and the surrounding vehicle equal to or less than a threshold value, distance between the vehicle 2 and the peripheral division line equal to or less than a threshold value, klaxon ringing, driver surprise behavior, etc. When it is determined that there is a risk candidate scene (step S10: YES), the control unit 15 extracts input/output information of the machine learning model 120 as step S12. Thus, the extraction data D is generated. Then, the control unit 15 notifies the user of monitoring information as step S14. The control unit 15 displays the monitoring information including the information that the extraction data D is generated via the user interface 13, or notifies the monitoring information by voice. When step S14 has ended, and when it is determined that there is no risk candidate scene (step S10: NO), the flowchart shown in FIG. 2 ends. By executing the flowchart illustrated in FIG. 2, it is possible to cause the user to appropriately monitor autonomous driving by the machine learning model 120.

Figure 3:
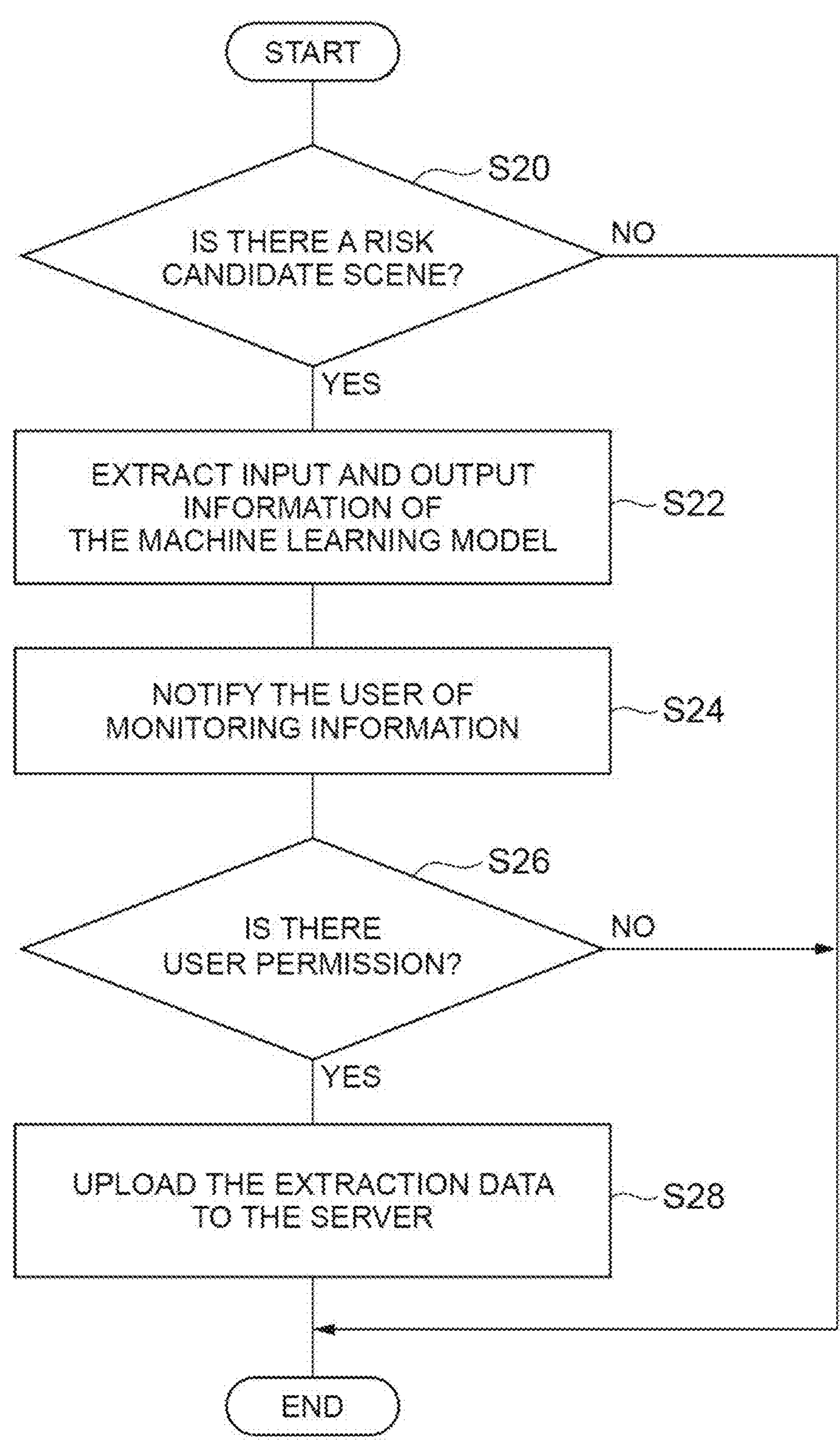
FIG. 3 is a flowchart illustrating an example of an operation of a n autonomous driving system according to the embodiment.

Next, another operation of the autonomous driving system 1 will be described. FIG. 3 is a flowchart illustrating an example of an operation of an autonomous driving system according to an embodiment. The flowchart shown in FIG. 3 is started when the autonomous driving system 1 receives a start instruction operation during autonomous driving by the autonomous driving system 1.

Steps S20, S22, and S24 shown in FIG. 3 are the same as steps S10, S12, and S14 shown in FIG. 2.

When step S24 is finished, the control unit 15 determines whether or not the user permits the transmission of the extraction data D as step S26. For example, the control unit 15 displays a transmission permission button or the like as the request information together with the monitoring information, and causes the user to select the transmission permission button. When it is determined that there is user permission (step S26: YES), the control unit 15 operates the transmission unit 17 to upload the extraction data D to the server 4, as step S28. When step S28 ends, when it is determined that there is no risk candidate scene (step S20: NO), and when it is determined that there is no user permission (step S26: NO), the flowchart shown in FIG. 3 ends. By executing the flowchart shown in FIG. 3, the extraction data D can be uploaded only when there is user permission.

Next, still another operation of the autonomous driving system 1 will be described. FIG. 4 is a flowchart illustrating an example of an operation of an autonomous driving system according to an embodiment. The flowchart illustrated in FIG. 4 is started when the autonomous driving system 1 receives a start instruction operation during autonomous driving by the autonomous driving system 1.

Steps S30, S32, and S34 shown in FIG. 4 are the same as steps S10, S12, and S14 shown in FIG. 2. The step S36 shown in FIG. 4 is identical to the step S26 shown in FIG. 3.

When it is determined that there is user permission (step S36: YES), the control unit 15 determines whether or not there is selection of the extraction data D, as step S38. For example, the control unit 15 presents a risk candidate scene to the user via the user interface 13. The user interface 13 receives a user selection operation of the risk candidate scene. When it is determined that the risk candidate scene is selected (step S38: YES), the control unit 15 extracts a data corresponding to the selected risk candidate scene and generates the extraction data D in step S40. The control unit 15 then operates the transmission unit 17 so that the extraction data D is uploaded to the server 4.

When it is determined that the risk candidate scene is not selected (step S38: NO), the control unit 15 extracts data corresponding to all the presented risk candidate scenes and generates the extraction data D as step S42. The control unit 15 then operates the transmission unit 17 so that the extraction data D is uploaded to the server 4.

When steps S40 and S42 are finished, when it is determined that there is no risk candidate scene (step S30: NO), and when it is determined that there is no user permission (step S36: NO), the flowchart shown in FIG. 4 is finished. By executing the flowchart shown in FIG. 4, the extraction data D related to the risk candidate scene selected by the user can be uploaded.

SUMMARY OF EMBODIMENT

According to the autonomous driving system 1, at least one risk candidate scene is determined based on at least one selected from a group of the detection result of the external sensor 10, the detection result of the internal sensor 11, and the operating state of the occupant of the vehicle 2. Then, the input value and the instruction value of the machine learning model 120 in the at least one risk candidate scene are extracted. Then, monitoring information including information indicating that the input value and the instruction value have been extracted is notified to the occupant of the vehicle 2. As described above, since the autonomous driving system 1 can autonomously determine the risk candidate scene and notify the user (occupant of the vehicle) of the monitoring information, the autonomous driving by the machine learning model 120 can be appropriately monitored by the user.

While exemplary embodiments have been described above, various omissions, substitutions, and changes may be made without being limited to the exemplary embodiments described above.

For example, permission of upload of the occupant is not necessarily performed at each timing of notification of the monitoring information, and may be comprehensively performed at the time of activation of the autonomous driving system 1.

The server 4 may be configured as a server group. The server 4 may include a data server that collects data uploaded from each vehicle. The data server may aggregate information from each vehicle and transmit the information via a WEB page or the like. As a result, the ranking of the risk candidate scene in consideration of the information of each vehicle can be published on the WEB page. The permission or selection of the user in the above-described embodiment may be executed through the published WEB page. A mechanism may be introduced in which an occupant who has selected a scene that many occupants have selected as a risk candidate scene can obtain a reward such as points.

What is claimed is:

1. An autonomous driving system comprising:

an external sensor configured to detect an external environment of a vehicle;

an internal sensor configured to detect a traveling state of the vehicle;

a machine learning model configured to receive a detection result of the external sensor and the detection result of the internal sensor as input values and output an instruction value of autonomous driving;

an operation unit configured to perform the autonomous driving of the vehicle based on the instruction value output by the machine learning model;

a user interface configured to exchange information with an occupant of the vehicle;

a transmission unit; and a control unit connected to the user interface, wherein the control unit is configured to:

determine at least one risk candidate scene based on at least one selected from a group of the detection result of the external sensor, the detection result of the internal sensor, and an operating state of an occupant of the vehicle;

extract at least one of the input values and the instruction value of the machine learning model in the at least one risk candidate scene;

cause the user interface to notify the occupant of the vehicle of monitoring information including information related to the at least one of the input values and the instruction value; and cause the transmission unit to transmit the monitoring information to a device outside of the vehicle;

wherein the monitoring information includes request information for selecting whether or not to perform transmission to the device outside of the vehicle; and wherein the control unit is configured to cause the transmission unit to transmit extraction data, which is the at least one extracted input value and the extracted instruction value of the machine learning model, to the device outside of the vehicle in response to reception of a response permitting transmission to the device outside of the vehicle via the user interface.

2. The autonomous driving system according to claim 1, wherein the control unit is configured to present the at least one risk candidate scene to the occupant of the vehicle through the user interface, and causes the transmission unit to transmit the extraction data corresponding to the risk candidate scene selected by the occupant of the vehicle through the user interface.

3. The autonomous driving system according to claim 2, wherein the control unit is configured to receive a ranking of the at least one risk candidate scene designated by the occupant of the vehicle through the user interface, and determine the extraction data to be transmitted by the transmission unit based on the ranking.

4. The autonomous driving system according to claim 2, wherein the control unit is configured to:

calculate a similarity between risk candidate scenes based on the at least one of the input values and the instruction value in the risk candidate scenes;

classify the risk candidate scenes into categories based on the similarity calculated; and prevent the risk candidate scenes to the occupant of the vehicle for each of the categories classified, through the user interface.

5. The autonomous driving system according to claim 2, wherein the control unit is configured to extract the data such that extraction data corresponding to the risk candidate scene instructed from the occupant of the vehicle through the user interface includes more information than extraction data corresponding to the risk candidate scene non-instructed.

* * * * *